Oct. 29, 1968
H. REES
3,407,444
INJECTION MOLDING MACHINE WITH SCRAP GRINDER
Filed May 19, 1966
2 Sheets-Sheet 1
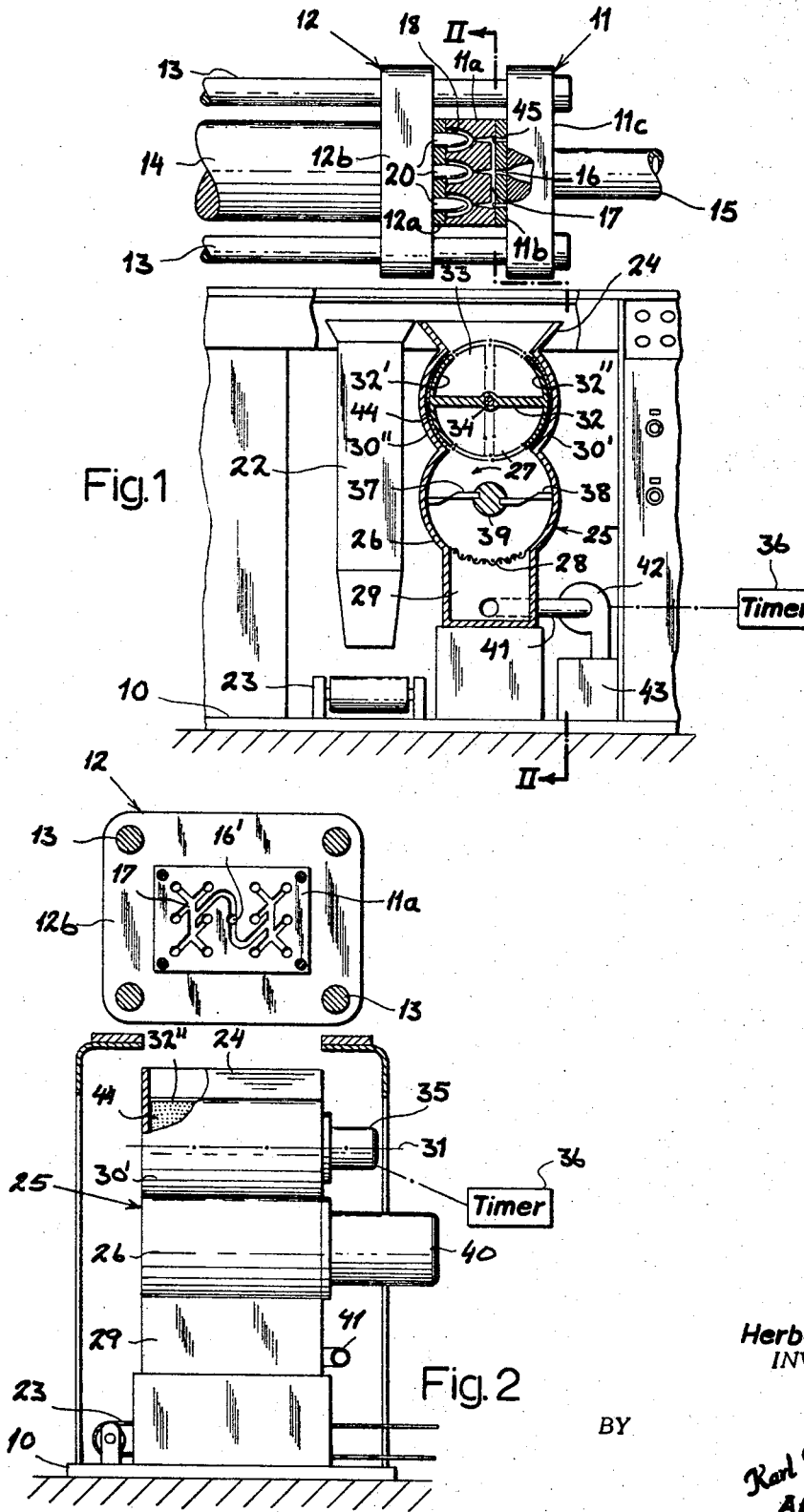
Herbert Rees
INVENTOR.
BY Karl G. Ross
Attorney

United States Patent Office 3,407,444
Patented Oct. 29, 1968

3,407,444
INJECTION MOLDING MACHINE WITH
SCRAP GRINDER
Herbert Rees, Willowdale, Ontario, Canada, assignor to
Husky Manufacturing and Tool Works Ltd., Toronto,
Ontario, Canada, a corporation of Canada
Filed May 19, 1966, Ser. No. 551,418
8 Claims. (Cl. 18—30)

ABSTRACT OF THE DISCLOSURE

Injection-molding machine with a scrap grinder underneath its split mold, the grinder being overlain by a rotatable lid whose rotation is synchronized with the opening and closure of the mold so that a runner ejected from the opening mold lands on the horizontally positioned lid and is thereafter delivered to the grinding knives by a rotation of the lid through 180°.

---

My present invention relates to an injection-molding machine in which articles of thermoplastic material are formed together with associated runners in a split mold having two or more separable portions, e.g. as disclosed in my U.S. Patent No. 3,117,348.

The concurrent molding of a runner together with the desired article or articles has the advantage of a cleaner separation between the articles and the residual mass entering the mold cavity or cavities through the sprue, as compared with articles produced by runnerless molding where the cutoff occurs at the injection orifice and objectionable protuberances or burrs are often produced at the gate.

When the residual mass is allowed to harden together with the article into a so-called "cold runner," the separation of this runner from the article usually occurs at the instance of mold opening, with the article remaining on one mold portion and the runner staying on another mold portion until both are ejected from their respective seats by conventional pins or the like. Thus, the articles and the runers are discharged at different locations and can be collected in separate receptacles from which the runner may be removed for recomminution and admixture with fresh thermoplastic granulate to be fed to the compression chamber of the machine leading to the injection orifice.

Heretofore, the runner receptacle had to be periodically emptied by hand for delivery to a grinder unless, in lieu of such receptacle, a conveyor was disposed underneath the machine for transporting the runners to the grinder as soon as they dropped from the mold. Both methods entailed the disadvantage of possible contamination of the reground thermoplastic material by foreign matter falling into the receptacle or onto the conveyor.

It is, therefore, the general object of my present invention to provide an improved arrangement for the recomminution of cold runers with avoidance of the disadvantage referred to.

A more particular object of my invention is to provide a system of this type in which the runners are fed automatically and in the shortest possible time to the grinder.

It is also an object of the invention to provide a grinder for a system of this type which is virtually foolproof in preventing the hands of the operator or other persons from coming into contact with its cutting mechanism.

In accordance with this invention I provide, underneath the mold in the path of ejection of the runners, one or more grinders intermittently enabled by suitable control means in timed relationship with the operating cycles of the machine, the enabling taking place preferably once per cycle substantially at the instant when the runner or runners drop from the mold. This arangement insures that during inactive periods, e.g. while adjustments are being made on the stationary machine, no extraneous matter will be admixed with the comminuted material already in the grinder.

In a particularly advantageous embodiment, the grinder has a housing with an entrance opening at the top and a shutter coupled to the aforementioned control means for blocking the opening during part of each operating cycle, the grinder being thus enabled by the relatively short withdrawal of the shutter from the entrance opening. The shutter, which preferably is in the form of a lid swingable about a horizontal axis, has the dual function of obstructing the access to the cutting mechanism in the grinder housing during off-periods and preventing this mechanism, which may include a set of rapidly rotating blades, from hurling relatively large runner fragments back through the opening toward the molding machine.

In order that the rotatable shutter may also effectively prevent an operator from inadvertently reaching into the rotating grinder, the oscillatably swingable or progressively rotatable shutter lid can be suitably confined in a throat portion of the grinder housing which defines two generally cylindrical, diametrically opposite wall segments centered on the swing axis of the lid at a short radial distance from the orbit of its edges, particularly if these edges are peripherally extended into a pair of arcuate flanges which complement the two wall segments to substantially a full circle; in practice, each of these flanges and wall segments may extend over an arc between substantially 90° and 135°. The cutting mechanism of the grinder is never directly accessible, yet a runner landing on the lid during one part of the machine cycle will be dumped into the grinder housing at a subsequent stage after the lid has been rotated through about 180°. A person, however, will not be able to insert his hand into the opening between the lid and the throat walls. A funnel may be mounted on the housing above the lid to help direct the ejected runners into the opening.

These and other features of my invention will become more fully apparent from the following description of a preferred embodiment, reference being made to the accompanying drawing in which:

FIG. 1 is a fragmentary front-elevational view (parts broken away) of an injection-molding machine equipped with a built-in grinder according to this invention;

FIG. 2 is a cross-sectional view taken on the line II—II of FIG. 1; and

Figure 3:
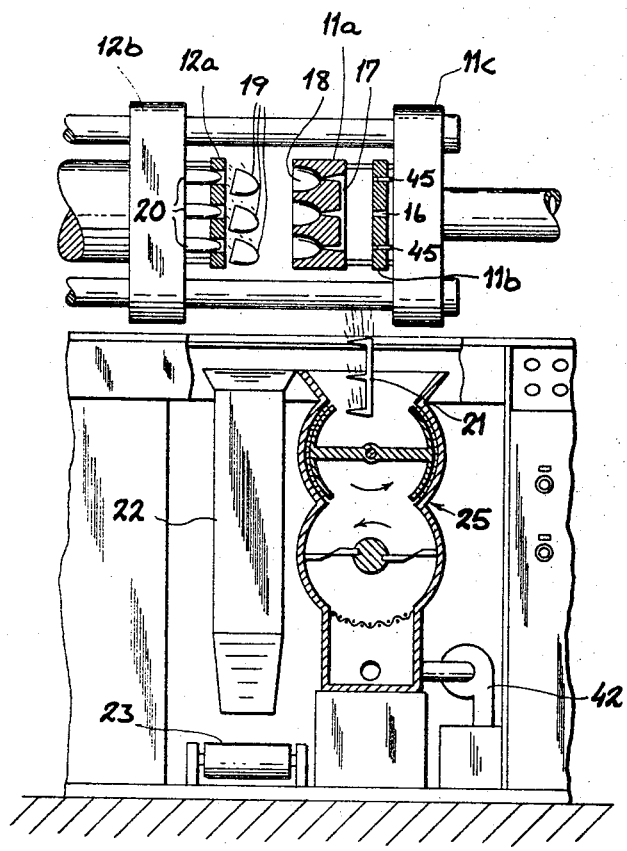
FIG. 3 is a view similar to FIG. 1, showing the machine at another stage of operation.

The molding machine shown in the drawing comprises a frame 10 supporting a split mold composed of two principal portions 11 and 12, mold portion 11 being substantially stationary whereas mold portion 12 is axially reciprocable along tie bars 13 for a periodic opening and closing of the mold as described in my above-identified U.S. patent. The reciprocation of mold portion 12 is brought about by a ram 14 linked to an intermittently driven crank not shown. Mold portion 11 communicates with a compression chamber in a piston housing 15 via a channel which terminates in an orifice 16 at the interface of two relatively movable plates 11a, 11b of mold portion 11 which further includes a third, stationary plate 11c. Mold portion 12 also comprises two relatively movable plates 12a and 12b.

A channel system 17 (FIG. 2) branches out from a center 16', confronting the injection orifice 16, to feed a multiplicity of cavities 18 formed in mold plate 11a at its contact surface with mold plate 12a. Upon the injection of liquefied thermoplastic material into the cavities 18 by way of channels 17, under the periodic pressure of a piston (not shown) advancing toward the orifice 16 in the closed position of the mold (FIG. 1), this material forms a multiplicity of articles 19 in the cavities 18, the articles adhering to cores 20 on mold plate 12a upon a separation of mold portions 11 and 12 during which a runner structure 21, initially formed in the channel system 17, stays on mold portion 11 where it is retained by conventional sucker pins 45 on the face of plate 11b. At a later point of the cycle (FIG. 3), mold plate 12b separates from plate 12a and withdraws the cores 20 from which the articles 19 are stripped by this relative motion; the articles, accordingly, drop through a chute 22 onto a conveyor 23 which transports them toward a further destination. At substantially the same time, or slightly before, the mold plates 11a and 11b move apart to leave a clearance for the runner 21 as seen in FIG. 3; promptly thereafter, plate 11b breaks away from plate 11c to an extent sufficient to withdraw the sucker pins 45, rigid with plate 11c, into plate 11b whereby the runner 21 is liberated and drops into a funnel 24 below the mold portion 11.

Funnel 24 constitutes the inlet of a grinder 25 mounted on the base of machine frame 10. This grinder has a cylindrical housing 26 with an entrance aperture 27 at the top and a screen 28 at the bottom, the screen overlying a receptacle 29 for comminuted plastic material. Above opening 27 a throat is formed, as an extension of housing 26, by a pair of cylindrically curved walls 30', 30" centered on an axis 31. Rotatable about this axis is a lid of generally I-shaped profile comprising a web 32 and two arcuate flanges 32', 32". The diametrically opposite, symmetrical cylinder segments 30', 30" extend each over an arc of approximately 100° so that the opening 27 and a similar inlet opening 33 at the bottom of funnel 24 each measure about 80°. Each of the flanges 32', 32" also has an arc length of about 100° so that the four cylindrically curved elements 30', 30", 32', 32" add up to more than a full circle. In the upright position of web 30, illustrated in dot-dash lines in FIG. 1, the flanges and segments thus overlap by about 10° on each side.

The lid 32, 32', 32", which may be regarded as a rotary valve body, is mounted on a horizontal shaft 34 of an electric motor 35 carried externally on the grinder housing. Motor 35 is driven intermittently by a timer 36, in synchronism with the drive means (not shown) for the movable mold portion 12 and the injection piston, so that the shutter constituted by the web 32 of the lid swings through an arc of 180° during a fraction of a machine cycle after the mold has opened and the runner 21 has dropped through the funnel 24 as illustrated in FIG. 3. This runner (or several of them in the case of multiple injection orifices) lands on top of the web 32 and, upon the reversal thereof, falls into the housing 26 where it is seized by a set of rotating knives 37 co-operating with stationary blades 38; knives 37 are mounted on a shaft 39 of a continuously operating electric motor 40 which is also flanged to the outer housing wall.

The comminuted plastic material passing through screen 28 into receptacle 29 is periodically evacuated therefrom, also under the control of timer 36, via suction pipe 41 connected to the intake port of a blower 42 which discharges the particles into a receptacle 43. From this receptacle the particles may be delivered by hand, or by a suitable conveyor not shown, to the feed hopper of the machine which returns them to the heating and compression chamber in housing 15 for reinjection into the mold cavities 18.

In order that rotation of the valve body 32, 32', 32" should not be impeded by fragments of plastic material becoming wedged between the walls 30', 30" and the flanges 32', 32", the outer surfaces of these flanges carry resilient bristles 44 which sweep the segments 30', 30" and prevent the intrusion of solids into the intervening clearance.

The provision of an overlap between the flanges of the rotary valve body and the segmental walls of the throat is not essential and the arc length of each of these elements may vary, preferably in a range between about 90° and 135°, without materially affecting the operation of the system described. A surface angle of about 100° for each of these elements has, however, given particularly satisfactory results by affording a favorable ratio between the size of the entrance openings 27, 33 and the throat radius, the dimensioning being such that the largest runner structure capable of clearing the openings will be properly accommodated within the throat after the web has started to swing. Naturally, the drive motor 35 for the rotating valve body should be of relatively low power, and/or coupled with shaft 34 via a slipping clutch, so as to avoid injuries to a person inadvertently reaching into the throat 30', 30"; for the same purpose the leading edges of flanges 32', 32" and at least the confronting edge (e.g. the left-hand edge in FIGS. 1 and 3) of inlet 33 may be suitably padded. Means (not shown) may be provided for releasably indexing the web 32 in its two horizontal positions.

I claim:

1. In an injection-molding machine having a split mold with separable portions for the formation of at least one molded article and an associated runner of thermoplastic material in each operating cycle, said runner and said article being ejectable from said mold at different locations upon separation of said portions, the combination therewith of grinder means disposed below said mold in the path of ejection of said runner for comminuting same, and control means for intermittently enabling said grinder means in timed relationship with the operating cycles of the machine; said grinder means comprising a housing with an entrance opening at its top, cutter means in said housing, and shutter means coupled with said control means for blocking said opening during part of each operating cycle; said shutter means including a lid swingable about a horizontal axis, said housing having a throat portion forming said opening and defining a pair of diametrically opposite generally cylindrical wall segments centered on said axis at a short radial distance from the orbit of two longitudinal edges of said lid.

2. The combination defined in claim 1 wherein said lid comprises a web terminating in a pair of diametrically opposite arcuate flanges centered on said axis, said edges forming part of said flanges.

3. The combination defined in claim 2 wherein said flanges and said wall segments extend over arcs complementing one another to substantially a full circle.

4. The combination defined in claim 3 wherein each of said arcs ranges between substantially 90° and 135°.

5. The combination defined in claim 2 wherein said web lies substantially in a diametrical plane including said axis.

6. The combination defined in claim 2 wherein said flanges are provided along their outer surfaces with resilient bristles projecting generally radially outwardly for sweeping said wall segments.

7. The combination defined in claim 1 wherein said control means comprises a timer and a drive motor responsive to said timer for swinging said lid through an arc of substantially 180° once during each operating cycle of the machine.

8. The combination defined in claim 7 wherein said housing is provided with a funnel above said opening, a screen below said cutter means, a receptacle for comminuted material underneath said screen and exhaust means connected with said receptacle for periodically removing said material therefrom under the control of said timer.

References Cited

UNITED STATES PATENTS

| | | |
|---|---|---|
| 2,995,775 | 8/1961 | Schnitzius et al. _____ 18—4 |
| 3,102,304 | 9/1963 | Divers _____ 18—30 |
| 3,208,113 | 9/1965 | Bennett. |

FOREIGN PATENTS 870,712  12/1941  France.

WILBUR L. McBAY, *Primary Examiner.*